(12) United States Patent
Ching et al.

(10) Patent No.: US 7,689,598 B2
(45) Date of Patent: Mar. 30, 2010

(54) METHOD AND SYSTEM FOR FILE SYSTEM SYNCHRONIZATION BETWEEN A CENTRAL SITE AND A PLURALITY OF REMOTE SITES

(75) Inventors: Jennie Ching, Northridge, CA (US); Eric Hsiao, San Marino, CA (US); Cris Sandoval, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 09/784,865

(22) Filed: Feb. 15, 2001

(65) Prior Publication Data
US 2002/0111959 A1   Aug. 15, 2002

(51) Int. Cl.
G06F 12/00 (2006.01)
G06F 17/30 (2006.01)
(52) U.S. Cl. .................................. 707/201; 707/10
(58) Field of Classification Search ............... 707/1–10, 707/100–104.1, 200–206; 709/248–249
See application file for complete search history.

(56) References Cited

U.S. PATENT DOCUMENTS

| | | | |
|---|---|---|---|
| 4,724,491 A | 2/1988 | Lambert | |
| 4,862,268 A | 8/1989 | Campbell et al. | |
| 5,029,014 A | 7/1991 | Lindstrom | |
| 5,055,924 A | 10/1991 | Skutta | |
| 5,058,096 A | 10/1991 | Ando et al. | |
| 5,099,319 A | 3/1992 | Esch et al. | |
| 5,197,047 A | 3/1993 | Witheridge et al. | |
| 5,216,515 A | 6/1993 | Steele et al. | |
| 5,237,682 A | 8/1993 | Bendert et al. | |
| 5,319,648 A | 6/1994 | Bux et al. | |
| 5,345,594 A | 9/1994 | Tsuda | |

(Continued)

FOREIGN PATENT DOCUMENTS

WO   WO9608923   3/1996

OTHER PUBLICATIONS

Munson, et al., Sync: a Java framework for mobile collaborative applications, Jun. 1997, IEEE, vol. 30, 59-66.*

(Continued)

*Primary Examiner*—Jean B Fleurantin
(74) *Attorney, Agent, or Firm*—Sawyer Law Group, P.C.

(57) ABSTRACT

A method and system of synchronizing files between a central site and a plurality of remote sites is disclosed. The method and system comprises providing a list of files to the plurality of remote sites by the central site, prior to a callback time of the remote sites and reporting which of the files are missing by each of the plurality of remote sites to the central site. The method and system further includes determining within the central site which of the files needs to be sent to each of the plurality of remote sites. Accordingly, a system and method in accordance with the present invention helps deliver content from a central site to multiple remote sites. A system and method in accordance with the present invention uses the DMD in conjunction with a software client described below to maintain the file synchronization between the central server and remote site servers.

14 Claims, 3 Drawing Sheets

U.S. PATENT DOCUMENTS

| | | | |
|---|---|---|---|
| 5,392,066 A | 2/1995 | Fisher et al. | |
| 5,412,416 A | 5/1995 | Nemirofsky | |
| 5,424,770 A | 6/1995 | Schmelzer et al. | |
| 5,428,732 A | 6/1995 | Hancock et al. | |
| 5,432,542 A | 7/1995 | Thibadeau et al. | |
| 5,442,771 A | 8/1995 | Filepp et al. | |
| 5,450,122 A | 9/1995 | Keene | |
| 5,463,771 A | 10/1995 | Sotoyanagi et al. | |
| 5,485,219 A | 1/1996 | Woo | |
| 5,493,677 A | 2/1996 | Balogh et al. | |
| 5,495,608 A | 2/1996 | Antoshenkov | |
| 5,499,046 A | 3/1996 | Schiller et al. | |
| 5,515,098 A | 5/1996 | Carles | |
| 5,532,939 A | 7/1996 | Psinakis et al. | |
| 5,550,863 A | 8/1996 | Yurt et al. | |
| 5,583,561 A | 12/1996 | Baker et al. | |
| 5,584,050 A | 12/1996 | Lyons | |
| 5,594,490 A | 1/1997 | Dawson et al. | |
| 5,600,366 A | 2/1997 | Schulman | |
| 5,600,573 A | 2/1997 | Hendricks et al. | |
| 5,652,613 A | 7/1997 | Lazarus et al. | |
| 5,659,351 A | 8/1997 | Huber | |
| 5,666,645 A | 9/1997 | Thomas et al. | |
| 5,726,909 A | 3/1998 | Krikorian | |
| 5,727,002 A | 3/1998 | Miller et al. | |
| 5,729,735 A | 3/1998 | Meyering | 707/10 |
| 5,745,756 A | 4/1998 | Henley | |
| 5,758,150 A * | 5/1998 | Bell et al. | 707/10 |
| 5,758,345 A | 5/1998 | Wang | |
| 5,761,432 A | 6/1998 | Bergholm et al. | |
| 5,809,235 A | 9/1998 | Sharma et al. | |
| 5,826,165 A | 10/1998 | Echeita et al. | |
| 5,835,911 A | 11/1998 | Nakagawa et al. | |
| 5,857,181 A | 1/1999 | Augenbraun | |
| 5,887,243 A | 3/1999 | Harvey et al. | |
| 5,892,535 A | 4/1999 | Allen et al. | |
| 5,907,494 A | 5/1999 | Dangelo et al. | |
| 5,913,039 A | 6/1999 | Nakamura et al. | |
| 5,920,700 A | 7/1999 | Gordon et al. | |
| 5,956,716 A | 9/1999 | Kenner et al. | |
| 5,960,406 A | 9/1999 | Rasansky et al. | |
| 5,990,884 A | 11/1999 | Douma et al. | |
| 5,990,927 A | 11/1999 | Hendricks et al. | |
| 5,996,025 A | 11/1999 | Day et al. | |
| 6,005,534 A | 12/1999 | Hylin et al. | |
| 6,011,758 A | 1/2000 | Dockes et al. | |
| 6,029,045 A | 2/2000 | Picco et al. | |
| 6,034,678 A | 3/2000 | Hoarty et al. | |
| 6,035,323 A | 3/2000 | Narayen et al. | |
| 6,044,381 A | 3/2000 | Boothby et al. | 707/10 |
| 6,058,422 A | 5/2000 | Ayanoglu | |
| 6,061,683 A * | 5/2000 | Alonso | 707/8 |
| 6,088,796 A | 7/2000 | Cianfrocca et al. | |
| 6,094,680 A | 7/2000 | Hokanson | |
| 6,144,999 A * | 11/2000 | Khalidi et al. | 709/219 |
| 6,151,598 A | 11/2000 | Shaw et al. | |
| 6,170,005 B1 | 1/2001 | Meandzija | |
| 6,185,573 B1 | 2/2001 | Angelucci et al. | |
| 6,192,363 B1 | 2/2001 | Yasumura | |
| 6,192,410 B1 | 2/2001 | Miller et al. | |
| 6,212,560 B1 | 4/2001 | Fairchild | |
| 6,222,530 B1 | 4/2001 | Sequeira | |
| 6,253,079 B1 | 6/2001 | Valentine et al. | |
| 6,256,673 B1 * | 7/2001 | Gayman | 709/232 |
| 6,279,157 B1 | 8/2001 | Takasu | |
| 6,298,385 B1 | 10/2001 | Sparks et al. | |
| 6,330,613 B1 | 12/2001 | Vlajnic et al. | |
| 6,336,115 B1 | 1/2002 | Tominaga et al. | |
| 6,353,831 B1 | 3/2002 | Gustman | |
| 6,370,550 B1 | 4/2002 | Douma et al. | |
| 6,378,036 B2 | 4/2002 | Lerman et al. | |
| 6,378,129 B1 | 4/2002 | Zetts | |
| 6,385,596 B1 | 5/2002 | Wiser et al. | |
| 6,405,317 B1 | 6/2002 | Flenley et al. | |
| 6,411,685 B1 | 6/2002 | O'Neal | |
| 6,412,009 B1 | 6/2002 | Erickson et al. | |
| 6,434,621 B1 | 8/2002 | Pezzillo et al. | |
| 6,434,680 B2 | 8/2002 | Belknap et al. | |
| 6,438,125 B1 | 8/2002 | Brothers | |
| 6,446,108 B1 | 9/2002 | Rosenberg et al. | |
| 6,463,585 B1 | 10/2002 | Hendricks et al. | |
| 6,466,734 B2 | 10/2002 | Yuen et al. | |
| 6,473,902 B1 | 10/2002 | Noritomi | |
| 6,487,721 B1 | 11/2002 | Safadi | |
| 6,510,558 B1 | 1/2003 | Linuma et al. | |
| 6,513,069 B1 | 1/2003 | Abato et al. | |
| 6,526,575 B1 | 2/2003 | McCoy et al. | |
| 6,535,878 B1 | 3/2003 | Guedalia et al. | |
| 6,571,391 B1 | 5/2003 | Acharya et al. | |
| 6,581,076 B1 | 6/2003 | Ching et al. | |
| 6,647,417 B1 | 11/2003 | Hunter et al. | |
| 6,687,737 B2 | 2/2004 | Landsman et al. | |
| 6,698,020 B1 | 2/2004 | Zigmond et al. | |
| 6,718,425 B1 | 4/2004 | Pajakowski et al. | |
| 6,763,523 B1 | 7/2004 | Sacilotto et al. | |
| 6,792,615 B1 | 9/2004 | Rowe et al. | |
| 6,799,326 B2 | 9/2004 | Boylan et al. | |
| 6,810,527 B1 | 10/2004 | Conrad et al. | |
| 7,039,930 B1 | 5/2006 | Goodman et al. | |
| 7,260,785 B2 | 8/2007 | Ching et al. | |
| 2002/0004936 A1 | 1/2002 | Aras | |
| 2002/0016831 A1 | 2/2002 | Peled et al. | |
| 2002/0077984 A1 | 6/2002 | Ireton | |
| 2002/0092019 A1 | 7/2002 | Marcus | |
| 2004/0210932 A1 | 10/2004 | Mori et al. | |
| 2008/0059997 A1 | 3/2008 | Plotnick et al. | |

OTHER PUBLICATIONS

Kshemkalyani., Synchronization for distributed real-time applications, Apr. 1-3, 1997, IEEE, 81-90.*

IBM Technical Disclosure Bulletin - "Task Scheduling", vol. 21, issue 5, pp. 1809-1810, published Oct. 1, 1978 (IBM).

* cited by examiner

30

16

METHOD AND SYSTEM FOR FILE SYSTEM SYNCHRONIZATION BETWEEN A CENTRAL SITE AND A PLURALITY OF REMOTE SITES

RELATED APPLICATIONS

The present invention is related to the following co-pending U.S. applications:
MULTIMEDIA INFORMATION COMPUTER SYSTEM AND METHOD OF OPERATION OF A PLAYLIST SCHEDULER, Ser. No. 09/420,802, filed on Oct. 19, 1999, and assigned to the assignee of the present invention; METHOD AND SYSTEM FOR OPTIMIZATION OF DISTRIBUTION TO REDUCE STORAGE REQUIREMENTS IN A DIGITAL MEDIA DISTRIBUTOR, Ser. No. 09/524, 082, assigned to the assignee of the present invention; METHOD AND SYSTEM FOR OBJECT RETRANSMISSION WITHOUT A CONTINUOUS NETWORK CONNECTION IN A DIGITAL MEDIA DISTRIBUTION SYSTEM, Ser. No. 09/773,047, as signed to the assignee of the present invention; and METHOD AND SYSTEM FOR ENSURING RELIABLE PLAYOUT IN A DMD SYSTEM, Ser. No. 09/523,827, assigned to the assignee of the present invention.

FIELD OF THE INVENTION

The present invention relates to digital media distribution and more particularly to web file server synchronization between a central site and remote sites.

BACKGROUND OF THE INVENTION

Although broadcasters have sophisticated systems for inserting national commercials into a program stream, including integrated traffic and billing systems, there are numerous obstacles to implementing a system to insert local commercials at small markets into a national program feed distributed by satellite. Until now, such local spot insertion advertising was the responsibility of the local broadcaster or cable operator.

Inserting local advertising poses several non-trivial technical, logistical and business challenges. First, literally hundreds of widely distributed local operators (or affiliates) would need to receive the commercials. Ad agencies would then have to ship analog tapes to hundreds of organizations, with different traffic and billing systems. The analog tapes would need to be tested for quality assurance, tracked, and stored until needed. The tapes would then have to be distributed to video tape recorders and readied for computer controlled playout (analog) at the proper time, 24 hours a day, seven days a week. Such infrastructure generally exists at well-funded affiliates in major markets but is nonexistent and prohibitively expensive for smaller operators or affiliates in small markets.

Managing such tapes with ads for local commercials and inserting them properly into the program feed is a complex undertaking not well-suited for the smaller operators, especially for channels with smaller audiences in smaller markets. A quality broadcast involves more than excellent program material; it must also provide seamless insertion of national and local advertisements, promotions, and station identifications.

Equally important is the ability to maintain the integrity of the national television programming. Centralized control of the channel's programming (playout) is required to prevent local affiliates from tampering with the programming. In addition, it is important that there be synchronization between a plurality of remote sites and the centralized control to ensure that information is provided to each of the remote sites in a timely and efficient manner.

Typically each remote site will have their own file system, they will deposit their web content onto the central site server under their file system. The requirement is to deliver only the new or updated files to the remote sites and maintain the same directory structure. The remote site and central site file system must be in synch. If a remote site is down or unoperational for a number of days, central site must resend the latest copy (there could be multiple updates to the same file while the remote site is down) of the file(s) again once the remote site comes alive. In other words, a central site must know what's missing on the remote sites and be intelligent enough to send the missing or out-dated files.

Accordingly, a need exists for an efficient system for optimized distribution of digital media data to remote sites in a multimedia broadcast system from the central site. The present invention addresses such a need.

SUMMARY OF THE INVENTION

A method and system of synchronizing files between a central site and a plurality of remote sites is disclosed. The method and system comprises providing a list of files to the plurality of remote sites by the central site, prior to a callback time of the remote sites and reporting which of the files are missing by each of the plurality of remote sites to the central site. The method and system further includes determining within the central site which of the files needs to be sent to each of the plurality of remote sites.

Accordingly, a system and method in accordance with the present invention helps deliver content from a central site to multiple remote sites. A system and method in accordance with the present invention uses the DMD in conjunction with a software client described below to maintain the file synchronization between the central server and remote site servers.

DETAILED DESCRIPTION

The present invention relates to digital media distribution and more particularly to web file server synchronization between a central site and a plurality of remote sites. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
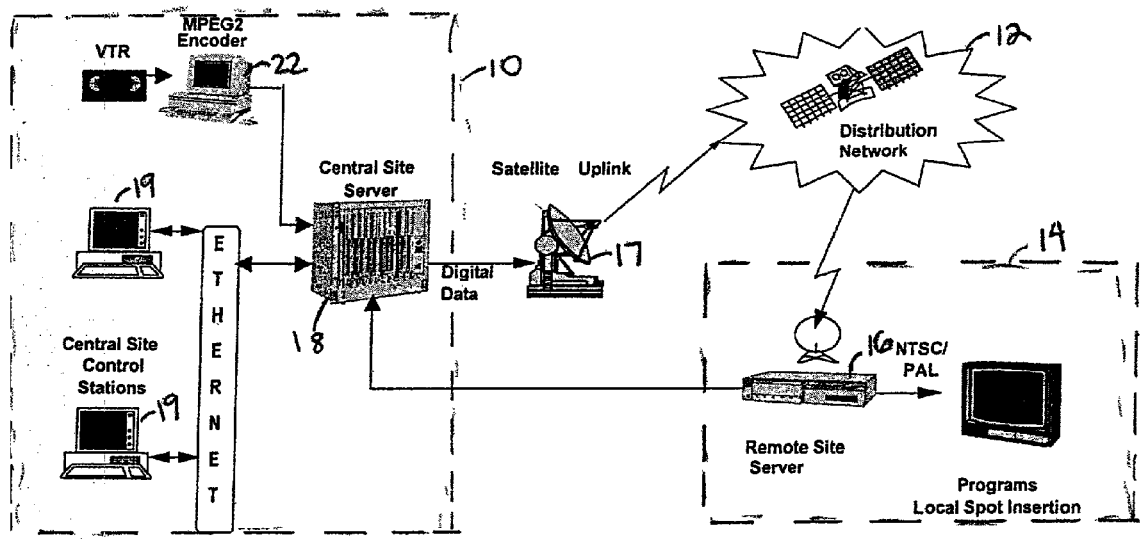
FIG. 1 illustrates a block diagram of a digital media distribution system in accordance with the present invention.

A block diagram of a DMD (digital media distributor) in accordance with the present invention is illustrated in FIG. 1. As shown, the DMD includes three major components: a central site 10, a distribution network 12, and a remote site 14. Although one remote site 14 is illustrated, one of ordinary skill in the art recognizes there is typically a plurality of remote sites for receiving and transmitting information. The central site 10 is the location for the digital encoding of MPEG-2 files from source video tapes, storage and management of digital files, management of remote site(s) 14, and distribution of schedules and MPEG-2 files. Thus, the processing, analysis, distribution, and management of data occurs at the central site 10. The distribution network 12 is the mechanism by which the remote site(s) 14 receive program streams and digital spots. The data distribution is accomplished via various methods, such as a satellite and/or land-based distribution. The broadcaster may choose to have the program stream sent via terrestrial links (e.g., token ring, ethernet, etc.), while the spot insertion is sent via satellites or vice versa.

The remote site(s) 14 house the remote site server(s) 16. By way of example, a suitable remote site server 16 includes a Pentium processor-based device with a hard disk for local storage and a video switch card (to switch between program and commercial insertion) running software including Windows NT, DMD programming, Lotus Notes client, Program Loader, and Symantec pcANYWHERE. These unattended, computerized systems receive the local insertion and provide As-Run file generation. The remote site server 16 is a video server that receives and stores digitized spots utilized for local insertion at the cable head-end. The remote site server 16 receives digitally encoded ads via satellite or other distribution network. These spots are decoded to an analog signal and inserted into the cable or network operator feed at scheduled times, i.e., into scheduled local availability times. The remote site server 16 can be customized in various configurations based on the number of output channels required, the type of output format (e.g., NTSC, PAL), the amount of local storage required (i.e., the number of spots on disk), the type of network (satellite or terrestrial), the type of trigger for spot insertion (e.g., time of day, VITC, cue-tome, VBI trigger), the audio format and connections (stereo, mini-XLR or XLR), the redundancy requirements (RAID, mirrored disks), and the preview channel.

By way of example, the following provides a sample process that illustrates an example of one process which the DMD solution can support. A region, e.g., any grouping of one or many cable head-ends for cities, states, provinces, or countries, defined by cable or network operators in an area, sells a commercial in the local availability time. All remote site servers 16 within the same region play the same material at the same time, including all network programs, national spots, local commercials, announcements, etc. The video-taped segment for the commercial is digitally encoded. The digital material is scheduled for delivery to each remote site server 16 prior to broadcast. The playlist, digitized spots, and the broadcast program stream are sent, via satellite, to all of the remote site servers 16 within the region. All of the remote site servers 16 within the region air the local spots for that region at the scheduled time. As-Run logs are retrieved by the central site 10 from the remote site servers 16. As-Run logs are sent to the local markets, reviewed, reconciled, and customers are billed. Commercials and As-Run logs are archived.

In accordance with the present invention, the central site 10 efficiently distributes objects and thus manages the resources of the remote site 14. By managing these resources, the central site 10 can determine when to send information to the remote site(s) 14. A main component in producing the management of the resources is the central site server 18. By way of example, a suitable central site server 18 includes an IBM RS/6000 F50 dual CPU system or a Pentium II compatible PC, running the IBM UNIX operating system, AIX, DB2 server software, Lotus Notes server software, ADSM, Windows NT (for PC-based central site server), and the DMD programming. Suitable components for the control workstations 19 include Pentium compatible PCs running Windows NT, Lotus Notes client, DB2 client, Microsoft Internet Explorer, and DMD programming.

Figure 2:
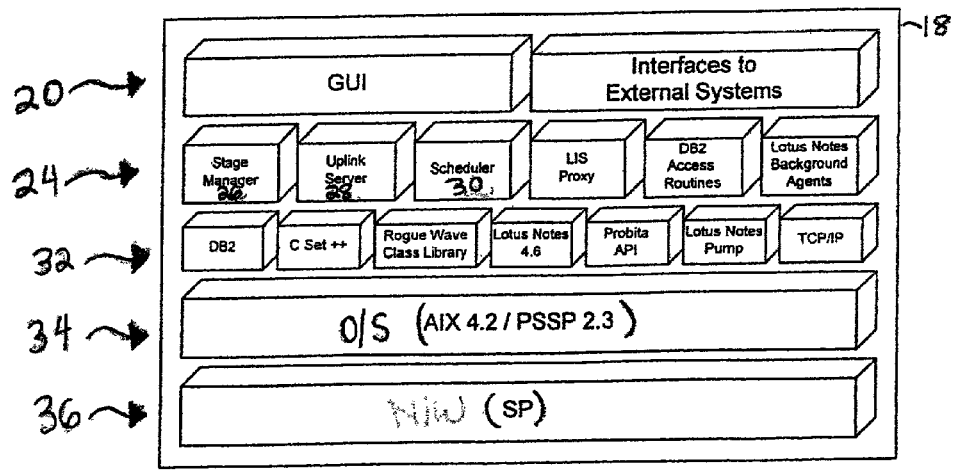
FIG. 2 illustrates an example of a suitable layered architecture for the central site server.

The central site server 18 includes software on a suitable computer readable medium that is architected using a layered model, in which each layer isolates the upper layers from the details of the lower layers and individual components within a layer provide a unique set of services, as is well appreciated by those skilled in the art. FIG. 2 illustrates an example of a suitable layered architecture for the central site server 18. The top layer 20 addresses the external interfaces of the central site server 18, including a graphical user interface (GUI) component and the interfaces to the external systems. The GUI component, e.g., using Lotus Notes, provides administrators and operators with the ability to monitor and control the DMD. The interfaces to external systems include interfaces to traffic systems, which interface to the central site 18 by way of files exchanged on an Internet file server, for example, interfaces to stations in a box (SIBs) which send Lotus Notes messages, and interfaces to encoder systems (22, FIG. 1), which store encoded spot files in a disk pool server for retrieval by the central site server 18.

Underneath the top layer is a layer 24 of specialized components including a stage manager component 26, an uplink server component 28, and a transmission scheduler component 30. This layer 24 may also include specialized components for creating commands and interpreting responses from SIBs, managing access to all the database queues and other data stores, and providing automated agents that run based on time or events to manage the external interfaces, e.g., processing files received from traffic systems. The stage manager 26 manages any tape related activity, the uplink server 28 manages transmissions through the uplink network (12, FIG. 1), and the transmission scheduler 30 manages scheduling tasks in accordance with the present invention.

Also included as a next layer is a programming layer 32. The layer 32 includes the programming libraries and APIs (application programming interfaces) that are used to build the specialized components. The lower two layers include an operating system layer 34 and a hardware layer 36 for the fundamental operation of the central site server 18, as is well appreciated by those skilled in the art.

Figure 2A:
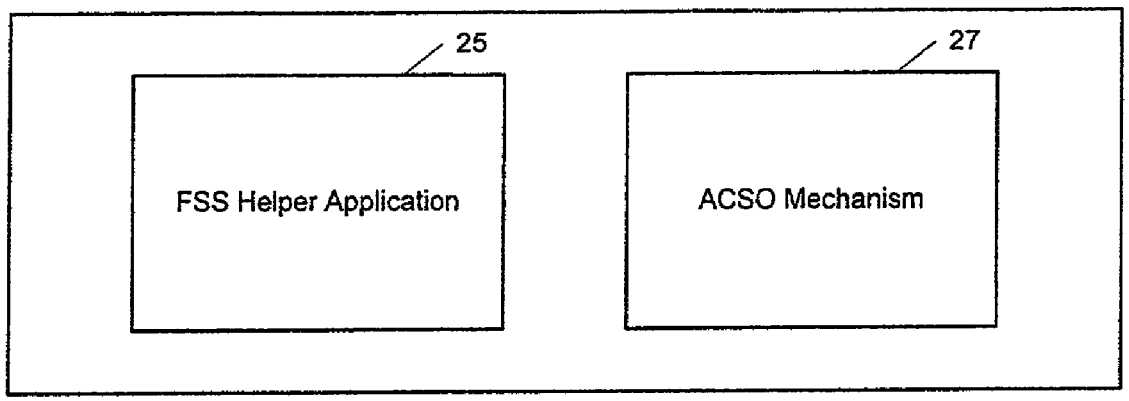
FIG. 2A illustrates an FSS helper application and an ACSO mechanism in a central site.
Figure 2B:
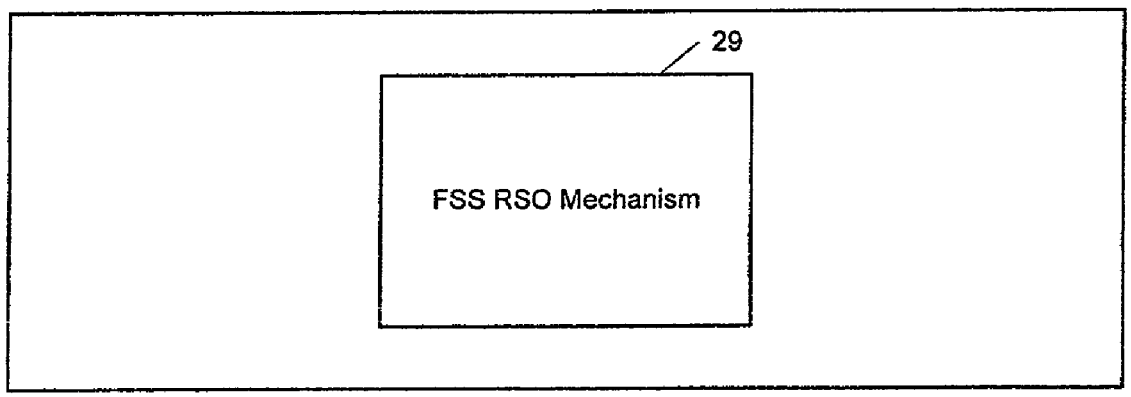
FIG. 2B illustrates an FSS RSO mechanism in a remote site.

There are two entities at the central site 10 that are utilized in accordance with the present invention for synchronizing the files of the central site 10 with the files of the plurality of remote sites 14, a file system synchronization (FSS) helper application 25 and an automated central site operations (ACSO) mechanism 27. Each of the remote sites 14 has an entity referred to as the FSS remote site operations (FSS RSO) mechanism 29. FIG. 2A illustrates an FSS helper application and an ACSO mechanism within the transmission scheduler 30 of the central site 10. FIG. 2B illustrates an FSS RSO mechanism within the remote site server 16 within the remote site. To describe the interaction of these entities refer now to the following discussion in conjunction with the accompanying figure.

A system and method in accordance with the present invention makes possible one way synchronization between a central site 10 and a plurality of remote sites 14. Additionally, using the system and method in accordance with the present invention, all remote sites 14 which subscribe to the same file system can be grouped and connected back to the central site 10 at the same time. Callback time can be programmed in the remote site application. At a predetermined, configurable period of time, such as five minutes before the callback time, the central site server prepares the latest loadlist for that group and sends it to the remote sites 14, thus giving remote sites 14 enough time to prepare for the "missing file list" and determine which files can be deleted from the remote site server 16.

In a preferred embodiment, the time is synchronized between central site 10 and remote sites 16. This is important because the time is used to determine the call back time and when the loadlist is generated on the central site. Time synchronization can be performed either by installing GPS clocks at the central site and all remote sites or by using time synchronization programs, such as NTP time server, W32Time from Microsoft Windows Resource Kit.

The central site 10 waits for the remote sites 14 to callback and report which files are missing. The central site 10 will wait until timeout (five minutes, for example, after the scheduled callback). After the remote sites 14 in the same group call back and deposit their "missing file list", the central site server will consolidate the list and determine if any files can be multicasted to multiple remote sites 14. The central site 10 can support multiple groups by partitioning the central site server into multiple file systems.

Accordingly, a system and method in accordance with the present invention helps deliver content from a central site to multiple remote sites. A system and method in accordance with the present invention uses the DMD in conjunction with a software client described below to maintain the file synchronization between the central server and remote site servers. To describe the features of the present invention in more detail, refer now to the following discussion in conjunction with the accompanying figure.

DMD-Integrated File System Synchronization

A method and system in accordance with the present invention ensures that the desired files in a specified file system are available on a remote site or sites 14 in the same file. Referring back to FIG. 1, the DMD is leveraged to minimize storage and transmission needs for the synchronization of files between the central site 10 and remote sites 14.

A remote site 14 may not receive files, for example, during power outages or bad weather. The central site 10, however, automatically keeps a master inventory of files as specified in a monitored file system for which there is a parallel file system at every remote site 14. Each of the remote sites 14 are configured to report back to the central site 10 at a pre-defined time, based on a callback scheduling algorithm. These report back periods are used to provide, among other data, information about the files that a remote site 14 will need. In so doing, the remote sites 14 save the most reliable information therewithin.

All remote sites 14 can be synchronized according to a central site's file system (or web server). A loadlist, which consists of file name, file path, file size, and timestamp of the file, is generated by the central site server and sent over to the remote sites 14. Each of the remote site servers 16 uses the latest loadlist to compare with the previously executed loadlist and then determines the files needed to be downloaded from the central site 10. The files can be deleted from the remote site 14. Filename, file path, file size, and the timestamp of the two loadlists are compared to determine new or updated files which need to be downloaded, and which files can be removed from the remote site's 14 local directory. The new or updated file list, which is called "missing file list", is then sent from the remote site 14 back to the central site 10.

The central site 10 uses the "missing file list" from remote sites 14 and transmits the files to the remote site 14. The remote site 14 receives the "missing files" and uses the information in the loadlist (the file path field) to move the files to the proper directory.

Figure 3:
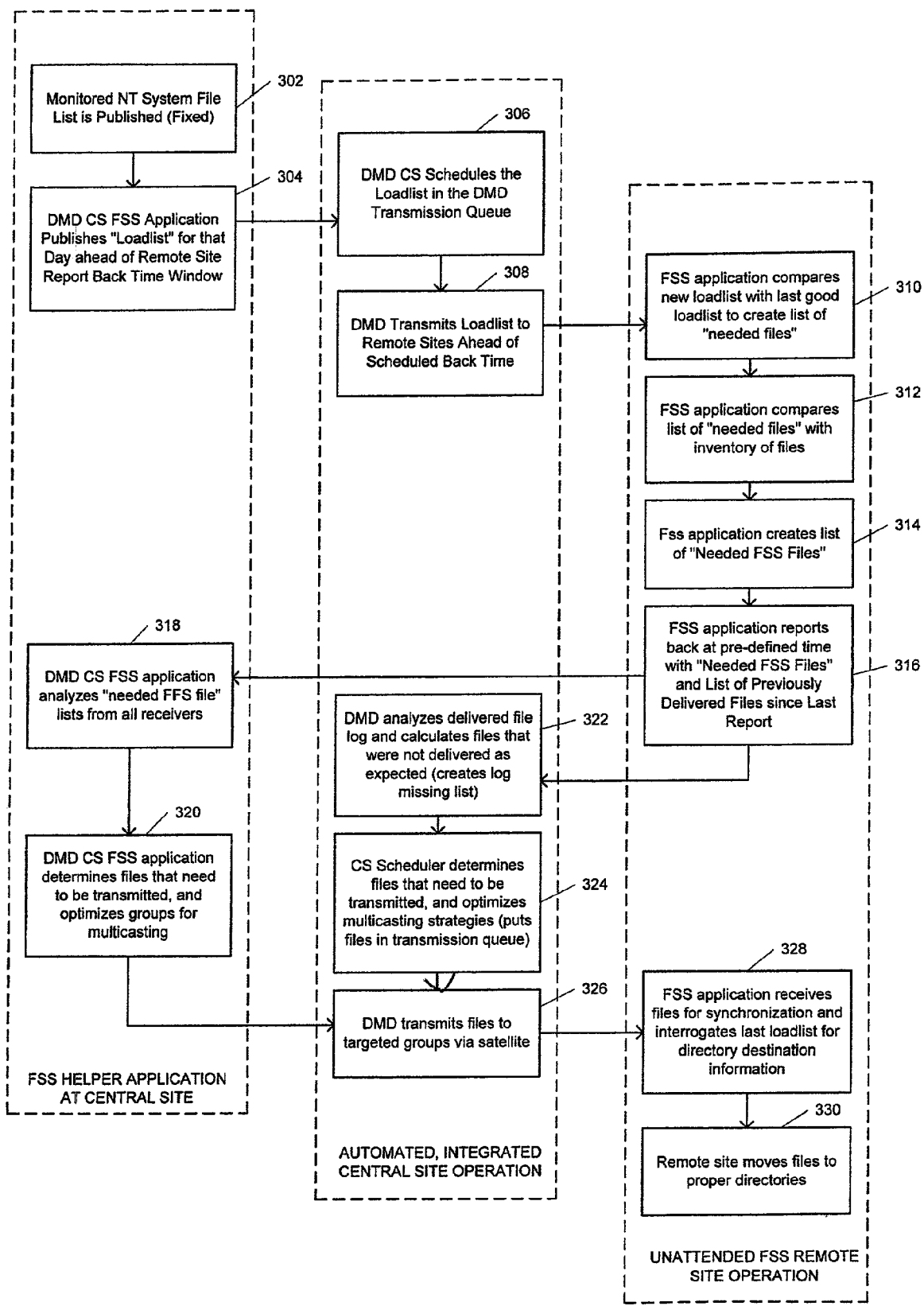
FIG. 3 illustrates a block flow diagram of a file synchronization process system in accordance with the present invention.

To describe the present invention in more detail, refer now to the following discussion in conjunction with the accompanying figure. FIG. 3 illustrates a flow diagram of a file synchronization process system in accordance with the present invention. As is seen, the steps 302, 304, 318 and 320 are executed by the FSS helper application 25, steps 306, 308 and 322-326 are executed by ACSO mechanism 27 and the steps 310-316, 328 and 330 are executed by FSS RSO mechanism 29.

Referring now to FIGS. 1, 2, 2A, 2B and 3 together, after the system is set up, the process starts when an updated master inventory of files in the monitored file system is "published", or fixed, for that day by the FSS helper application 25, via step 302. Typically the file system comprises an NT file system. The fixing of the updated files typically will occur a few hours ahead of a pre-defined report back time for the remote sites 14 participating in the file system synchronization.

In a preferred embodiment, the FSS helper 25 application, also running on an NT platform, prepares the list of the files in the file system (loadlist file), including the fall paths (directory structures), and the date-time stamp for each file. The loadlist file is date-time stamped and then transferred to the remote sites 14 ahead of the scheduled report back time, via step 304. The ACSO mechanism 27 then schedules the loadlist in a transmission queue within the DMD, via step 306. Next, the ACSO mechanism 27 transmits the loadlist to remote sites 14 ahead of the scheduled return time, via step 308.

Upon receiving the loadlist, the FSS RSO mechanism 29 compares the new loadlist against the last copy of the loadlist to create a list of files it will need, via step 310. These files may have changed, as evidenced by comparison of the date-time stamp of the files in the loadlist. The FSS RSO mechanism 29 then compares the list of needed files with an inventory of files that are to be found locally, via step 312, and builds a report of files "needed" for file system synchronization, via step 314.

The remote sites 14 then report back to the central site 10 upon a pre-defined schedule with the list of needed FSS files, via step 316. Once communications have been re-established, the central site 10 automatically begins the synchronization process, via step 318, and sends both additional files (and may also send commands) as needed, via step 320. If, for example, a remote site 14 has gone down for four days, it will make its comparisons with the last good "loadlist" and current inventory, and will report the list of needed FSS files based only on the latest information.

Additionally, the remote site 14 will send to the central site 10 a list of all the files that were delivered since the last report back to the central site 10, also via step 316. The ACSO mechanism 27 will then compare the list of delivered files with the list of files that the central site 10 believes the remote site 14 should have, and calculates a list of files that should have been delivered but are "missing" (i.e., the delivered files missing log), via step 322. The ACSO mechanism 27 will then add these missing files to the distribution list for this receiver.

The reports of needed FSS files, and lists of missing "delivered" files from earlier distribution requests, are handed off to the ACSO mechanism 27, which automatically determines which remote sites 14 share a need for the same files, and then optimizes the distribution of those files for multicasting to various groups of remote sites 14, via step 324.

Through the use of the "Needed FSS files" as well as the delivered log-based calculations for missing files, files do not need to be transferred that were perhaps once needed for synchronization purposes, but that are no longer needed (such as transient news stories which may have been replaced by updated accounts). A system and method in accordance with the present invention helps ensure that the unneeded files are not transferred while keeping remote site 14 content up-to-date. For example, if a remote site 14 were to go down on the third day of operation, and not return to service until the day six, files would not be automatically transferred that had been needed for days 4 and 5 unless they were specified as needed on day 6.

The ACSO mechanism 27 then transfers the files much as any other DMD transmission object to the plurality of remote sites 14, via step 326.

Upon receiving the files, the FSS RSO mechanism 29 interrogates its last known loadlist, which contains fall path information for every file in the NT file system, to determine the final location (i.e., directory) of the file, via step 328, and then moves the file to that directory, via step 330.

The system and method in accordance with the present invention has the following advantages over conventional systems:

1. The system and method is simple and scaleable. The central site 10 only needs to know the loadlist of its own server. No keeping track of each remote site "history file" is required. Work is distributed to each remote site 14. A remote site 14 uses the most recent loadlist and the previously executed loadlist to determine what needs to be transmitted from central site 10 and will send a request to central site 10 via a "missing file list". When there are hundreds of thousands of remote sites 14 trying to connect back to the central site and sync the file system, figuring out who needs what requires a lot of computation time if all the work is done by the central site is a complex task.

2. The system and method operates automatically. The user does not need to be prompted to select the more current data.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method of synchronizing files between a central site and a plurality of remote sites;
   wherein the computer performs the following functions comprising:
   (a) providing a list of files to the plurality of remote sites by the central site;
   (b) reporting which of the files from the list of files are missing by each of the plurality of remote sites to the central site; and
   (c) determining within the central site which of the files from the list of files needs to be sent to each of the plurality of remote sites;
   wherein the list of files comprises a loadlist;
   wherein each of the files in the loadlist are date and time stamped.

2. The computer implemented method of claim 1 in which the providing utilizes a file system synchronization (FSS) helper application.

3. The computer implemented method of claim 1 in which the reporting utilizes a file system synchronization remote site operation mechanism.

4. The computer implemented method of claim 1 in which the determining utilizes an automated central site operation mechanism.

5. The computer implemented method of claim 1 wherein the central site provides the list of files to the plurality of remote sites prior to a callback time of the remote sites.

6. A system for synchronizing files comprising:
   a central site including a first processors, said first processor including the central site including a file system synchronization (FSS) helper application and an automated central site operations (ACSO) mechanism for transmitting a list of files; and
   at least one remote site, the at least one remote site including a second processors, said second processors including a file system synchronization remote operating mechanism (FSS RSO), wherein the FSS RSO mechanism creates a group of files it will need based upon the transmitted list of files, wherein the at least one remote receives the transmitted list of files; wherein the remote site reports which of the files from the list of files are missing to the central site, wherein the central site determines which of the files from the list of files needs to be sent to the at least one remote site.

7. The system of claim 6 wherein the list of files comprises a loadlist.

8. The system of claim 7 wherein each of the files in the loadlist are date stamped.

9. The system of claim 6 wherein the central site provides the list of files to the plurality of remote sites prior to a callback time of the remote sites.

10. A computer program product, tangibly stored on a computer storage for synchronizing files between a central site and a plurality of remote sites, the product comprising instructions to cause a processor to:
    (a) providing a list of files to the plurality of remote sites by the central site;
    (b) reporting which of the files from the list of files are missing by each of the plurality of remote sites to the central site; and
    (c) determining within the central site which of the files from the list of files needs to be sent to each of the plurality of remote sites;
    wherein the list of files comprises a loadlist;
    wherein each of the files in the loadlist are date and time stamped.

11. The computer program product of claim 10 in which the providing step (a) utilizes a file system synchronization (FSS) helper application.

12. The computer program product of claim 10 in which the reporting step (b) utilizes a file system synchronization remote site operation mechanism.

13. The computer program product of claim 10 in which the determining step (c) utilizes an automated central site operation mechanism.

14. The computer program product of claim 10 wherein the central site provides the list of files to the plurality of remote sites prior to a callback time of the remote sites.

* * * * *